United States Patent [19]

Schad

[11] 3,942,383
[45] Mar. 9, 1976

[54] WHEEL BALANCING DEVICES
[76] Inventor: Jerome G. Schad, R.D. 1, Evans City, Pa. 16033
[22] Filed: Nov. 8, 1974
[21] Appl. No.: 522,263

[52] U.S. Cl. .................................................. 73/483
[51] Int. Cl.² ........................................... G01M 1/14
[58] Field of Search ............................. 73/483–487

[56] References Cited
UNITED STATES PATENTS

| | | |
|---|---|---|
| 2,631,452 | 3/1953 | Hutter .................................... 73/484 |
| 2,720,110 | 10/1955 | Lucht ..................................... 73/484 |
| 3,777,575 | 12/1973 | Smithmeyer ........................... 73/483 |

Primary Examiner—James J. Gill

[57] ABSTRACT

A static wheel balancer is provided having a universally tiltable balancing head that is small enough to fit in the glove compartment of an automobile.

1 Claim, 3 Drawing Figures

WHEEL BALANCING DEVICES

BRIEF SUMMARY OF THE INVENTION

A Wheel Balancing Device sufficiently compact as to be storeable in the glove compartment of an automobile and comprising a supportive plate, spindle and collar, and ball-rocker, so combined as to provide a highly sensitive, yet simple-to-use instrument especially suited for non-professional operators.

DESCRIPTION OF PREFERRED EMBODIMENT

This invention relates to a manually portable device for the static balancing of pneumatic automobile tires together with their supporting wheels, consisting of a supporting plate 1 to which is affixed a spindle 2 for centering-reference, and whose upper surface is paralell to the supporting plate so as to support correctly thereon a circular bubble-level, a spindle collar 3 composed of resilient material and placed between the spindle and the wall of the wheel center hole, said spindle collar being interchangeable with others of different diameters so as to accomodate an unlimited range of wheel sizes, and a hemispherical protrusion 4 at the center of the under surface of the supporting plate to serve as a pivotal support for the total assembly of tire, wheel, and balancing device.

In operation, this device is pressed into place in the center of the wheel with the spindle and its collar being pushed through the center hole of the wheel from the deep or hollow side of the wheel, and until the supporting plate is firmly in contact with the wheel's mounting surface. Due to the dimensions and resiliency of the collar, the device remains firmly held in its centered position on the wheel. The entire assembly of tire, wheel, and balancer, acting as a unit, is then placed so that it rests by means of the ball-shaped center protrusion on any suitable and substantially level plane surface, and the bubble-level is placed on top of the spindle.

Figure 2:
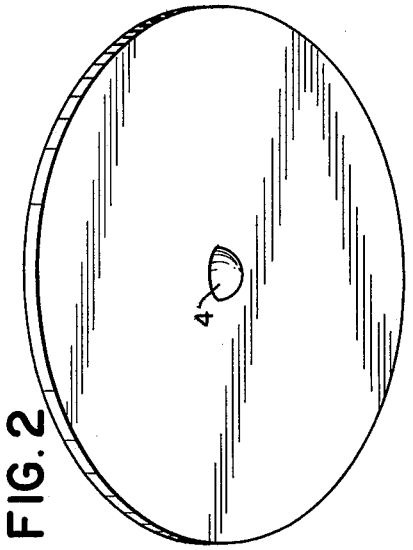
FIG. 2 shows the placement of the ball-rocker 4 from below.
Figure 1:
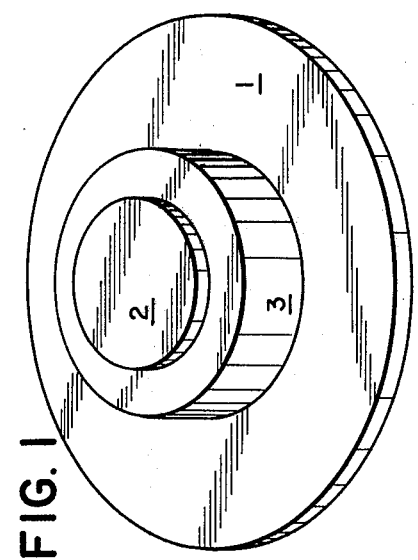
FIG. 1 shows the inter-relationship of the plate 1, the spindle 2, and the spindle collar 3 from above.
Figure 3:
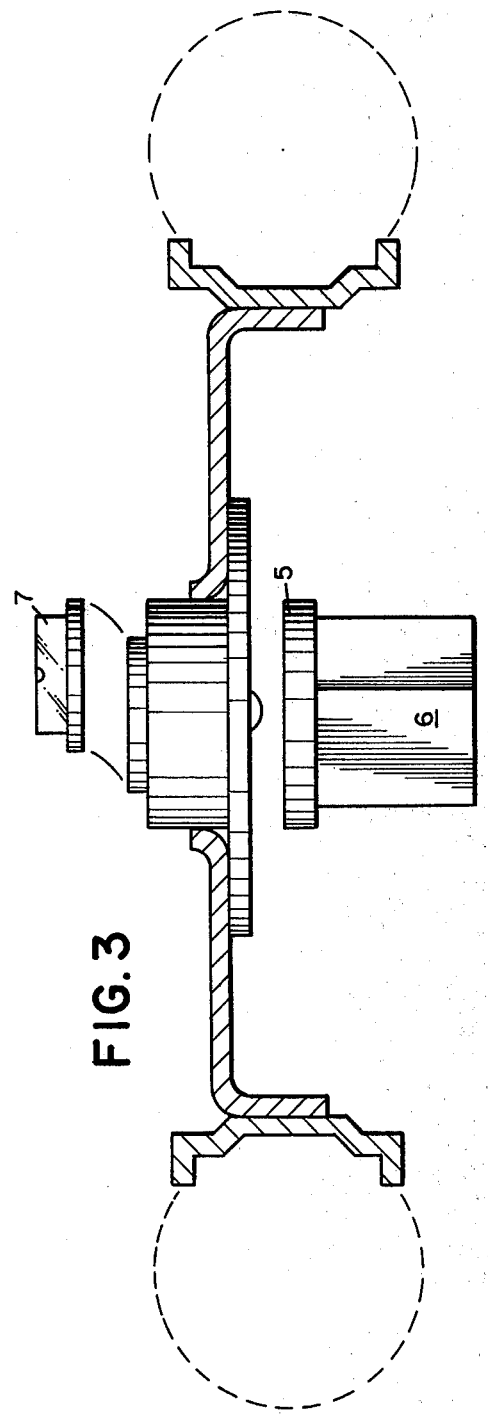
FIG. 3 shows the relationship of the total unit in position on the wheel and in relation to a plane surface 5, a wood block 6, and a bubble-level 7.

The operator has innumerable options in selecting a suitable object for this purpose, such as a conveniently sized piece of metal or plastic, supported on top of a convenient object such as a block of wood, a masonry brick, or a can. FIG. 3 illustrates the general arrangement of this support, with 5 being the plane surface, in turn resting upon any convenient object 6. The bubble-level 7 can be utilized to check the level condition of this surface prior to the testing of the wheel itself.

As can be seen from FIG. 3 this device takes advantage of the above-center-of-gravity placement of the mounting inner face of automobile wheels in such a way that the wheel is in fact suspended on the ball rocker, thereby allowing a gentle rocking range of several degrees in any direction, so that the wheel is free to tilt to the heavy side, causing the bubble to render a radial indication of the location of the imbalance resultant. Then by the application of conventional balancing weights, the tire and wheel can be brought into correct balance.

A high degree of sensitivity and accuracy in this device results from the absense of energy-absorbing mechanisms such as damping systems to limit oscillations. The performance of prototypes of the device has shown such oscillations to be inconsequential, since they represent no more than a few seconds of time in the balancing of a single wheel.

The absence of integral legs or base results in compactness such that the device can easily be stored in the glove compartment of the average automobile.

The present disclosure of the invention presents only one illustrative embodiment of the device and should not be construed as a limitation of its form. For example; additional optional forms which the disclosure and drawings contemplate include one form of the device in which the hemispherical protrusion, or ballrocker may be positioned within a hollow spindle and either fixed in its height above the plane of the supporting plate or variable in this respect, yet without departing essentially from the basic invention itself. In the same context, various configurations of the supportive plate 1 other than disc-shape are admissable.

The above described features of this invention combine to effect its objective of providing a device that is sensitive, accurate, compact, portable, and simple to operate, so as to create a wheel balancing device suitable for use by non-professional operators, including automobile owners.

I claim:

1. A device for detecting the imbalance of automobile wheels comprising a flat plate to which is affixed at the center of one surface of said plate a spindle of cyclindrical configuration for the purpose of centering reference and a mating collar of cylindrical configuration surrounding said spindle, the greater diameter of said collar being slightly larger than the diameter of the center hole of the wheel to be tested, and said collar being composed of resilient material whereby being introduced into the deep or hollow side of the wheel to be balanced and brought face to face with the center hole of the wheel, the resilient collar can be manually pressed through the hole so as to bring said plate into firm contact with the wheel's mounting surface, whereupon the resilient collar, by virtue of being somewhat compressed uniformly within the wheel opening then retains the position of the device securely in the wheel; and on the opposite surface of said plate and integral therewith at its center, a protrusion of symmetrically convex configuration whereby the wheel may be positioned over an appropriate plane surface so as to rock or pivot on the said plate, and the wheel's imbalance shown by means of placing a spirit-level on top of the said spindle.

* * * * *